US009803745B2

(12) United States Patent
Kutsubo et al.

(10) Patent No.: US 9,803,745 B2
(45) Date of Patent: Oct. 31, 2017

(54) OIL SUPPLY DEVICE

(71) Applicant: AISIN AW CO., LTD., Anjo-shi, Aichi-ken (JP)

(72) Inventors: Hiroyuki Kutsubo, Anjo (JP);
Yoshimitsu Hyodo, Nishio (JP);
Kenichi Tsuchida, Nishio (JP);
Naoyuki Fukaya, Okazaki (JP);
Kazunori Ishikawa, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 231 days.

(21) Appl. No.: 14/652,358

(22) PCT Filed: Jan. 17, 2014

(86) PCT No.: PCT/JP2014/050855
§ 371 (c)(1),
(2) Date: Jun. 15, 2015

(87) PCT Pub. No.: WO2014/112605
PCT Pub. Date: Jul. 24, 2014

(65) Prior Publication Data
US 2015/0330501 A1    Nov. 19, 2015

(30) Foreign Application Priority Data

Jan. 18, 2013  (JP) ................................. 2013-007649

(51) Int. Cl.
*F16K 11/07*    (2006.01)
*F16H 61/02*    (2006.01)
(Continued)

(52) U.S. Cl.
CPC ......... *F16H 61/0206* (2013.01); *F16H 61/00* (2013.01); *F16H 61/0025* (2013.01);
(Continued)

(58) Field of Classification Search
CPC .. F16H 61/0206; F16H 61/0025; F16H 61/00; F16H 2061/0279; F16K 11/07
(Continued)

(56) References Cited

U.S. PATENT DOCUMENTS 4,598,626 A * 7/1986 Walters ................... F15B 13/16
137/625.64
6,027,427 A * 2/2000 Yoo ..................... F16H 61/0206
477/130
(Continued)

FOREIGN PATENT DOCUMENTS

CN    101896752 A    11/2010
JP    S48-19626 Y1    6/1973
(Continued)

OTHER PUBLICATIONS

Apr. 15, 2014 International Search Report issued in International Application No. PCT/JP2014/050855.

*Primary Examiner* — Eric Keasel
(74) *Attorney, Agent, or Firm* — Oliff PLC

(57) ABSTRACT

In a sleeve, two input ports are formed as ports that receive a discharge pressure of an electromagnetic pump, and a drain port connected to a drain oil passage is formed on the same circumference as that on which the input port is formed, so as to have a smaller opening area than the input port and an output port connected to an oil passage. The axial length of the second land is set so that the input port can be closed by the second land when a signal pressure is equal to or higher than a set pressure, and that the input port and the drain port can be closed by the second land when the signal pressure is lower than the set pressure.

5 Claims, 8 Drawing Sheets

(51) Int. Cl.
*F16H 61/00* (2006.01)
*F16K 31/122* (2006.01)
*F16H 61/686* (2006.01)

(52) U.S. Cl.
CPC ............ *F16H 61/686* (2013.01); *F16K 11/07* (2013.01); *F16K 31/122* (2013.01); *F16H 2061/0279* (2013.01)

(58) Field of Classification Search
USPC ................ 137/595, 597, 625.18, 625.48
See application file for complete search history.

(56) References Cited

U.S. PATENT DOCUMENTS

| | | | | |
|---|---|---|---|---|
| 6,569,050 B2* | 5/2003 | Suzuki | ................ | F16H 61/0206 475/122 |
| 6,634,991 B2* | 10/2003 | Itou | ................ | F16H 61/12 475/119 |
| 6,752,734 B2* | 6/2004 | Itou | ................ | F16H 61/0276 137/625.34 |
| 6,796,546 B2* | 9/2004 | Wayman | ................ | F16K 11/07 251/321 |
| 7,163,481 B2* | 1/2007 | Takagi | ................ | F16H 61/0206 192/3.57 |
| 8,308,612 B2* | 11/2012 | Shimizu | ................ | F04B 17/044 417/416 |
| 8,984,874 B2* | 3/2015 | Shimizu | ................ | F04B 17/03 60/428 |
| 2005/0064975 A1 | 3/2005 | Takagi et al. | | |
| 2009/0301588 A1 | 12/2009 | Shimizu et al. | | |
| 2010/0028168 A1* | 2/2010 | Shimizu | ................ | F04B 17/044 417/213 |
| 2012/0144818 A1* | 6/2012 | Shimizu | ................ | F04B 17/03 60/459 |

FOREIGN PATENT DOCUMENTS

| | | |
|---|---|---|
| JP | S50-105027 U | 8/1975 |
| JP | 2005-090659 A | 4/2005 |
| JP | 2012-122560 A | 6/2012 |

* cited by examiner

| | C-1 | C-2 | C-3 | B-1 | B-2 | F-1 |
|---|---|---|---|---|---|---|
| P | | | | | | |
| REV | | | ○ | | ○ | |
| N | | | | | | |
| D 1st | ○ | | | | ● | ○ |
| D 2nd | ○ | | | ○ | | |
| D 3rd | ○ | | ○ | | | |
| D 4th | ○ | ○ | | | | |
| D 5th | | ○ | ○ | | | |
| D 6th | | ○ | | ○ | | |

●: ENGAGED WHEN ENGINE BRAKE IS IN OPERATION

A-A SECTION

D-D SECTION

B-B SECTION

E-E SECTION

C-C SECTION

A-A SECTION

D-D SECTION

B-B SECTION

E-E SECTION

C-C SECTION

OIL SUPPLY DEVICE

TECHNICAL FIELD

Preferred embodiments relate to oil supply devices.

BACKGROUND ART

As such oil supply devices, a device is conventionally proposed which includes: a mechanical pump that is operated by power from an engine to generate an oil pressure; a linear solenoid valve that regulates the oil pressure from the mechanical pump to output the regulated oil pressure from an output port to an output port oil passage; an electromagnetic pump that generates an oil pressure by an electromagnetic force to output the generated oil pressure from a discharge port to a discharge port oil passage; and a spool relay valve that has a spool having a plurality of lands and a sleeve (housing) accommodating the spool such that the spool can move in the axial direction, and that is operated by a signal pressure generated based on the oil pressure from the mechanical pump (see, e.g., Patent Document 1). In this device, a first land, a second land, and a third land as the plurality of lands are formed side by side in the axial direction in this order in the spool. In the sleeve, an input port (mechanical pump-side input port) connected to the output port oil passage, an output port connected to a clutch oil passage, an input port (electromagnetic pump-side input port) connected to the discharge port oil passage, and a drain port connected to a drain oil passage having a check valve attached thereto are formed in this order in the axial direction. The sleeve has a first oil chamber defined by the opposing surfaces of the first land and the second land, and a second oil chamber defined by the opposing surfaces of the second land and the third land. When the signal pressure is equal to or higher than a predetermined pressure, the relay valve allows the mechanical pump-side input port to communicate with the output port via the first oil chamber, allows the electromagnetic pump-side input port to communicate with the drain port via the second oil chamber, and shuts off communication between the electromagnetic pump-side input port and the output port by the second land being located between these ports. When the signal pressure is lower than the predetermined pressure, the relay valve allows the electromagnetic pump-side input port to communicate with the output port via the first oil chamber, shuts off communication between the mechanical pump-side input port and the output port by closing the mechanical pump-side input port by the first land, and shuts off communication between the electromagnetic pump-side input port and the drain port by the second land being located between these ports. With this configuration, even if oil having a high oil pressure leaks from the first oil chamber to the second oil chamber with the mechanical pump-side input port communicating with the output port via the first oil chamber and with the electromagnetic pump-side input port communicating with the drain port via the second oil chamber, this oil can be drained from the second oil chamber via the drain port, the drain oil passage, and the check valve. A proper oil pressure can thus be maintained in the discharge port oil passage.

[Patent Document 1] Japanese Patent Application Publication No. 2012-122560 (JP 2012-122560 A)

SUMMARY

Patent Document 1 describes the case where oil having a high oil pressure leaks from the first oil chamber to the second oil chamber with the mechanical pump-side input port communicating with the output port via the first oil chamber and with the electromagnetic pump-side input port communicating with the drain port via the second oil chamber. However, Patent Document 1 does not look at the case where oil pumped from the electromagnetic pump leaks from the first oil chamber to the second oil chamber with the electromagnetic pump-side input port communicating with the output port via the first oil chamber and with communication between the electromagnetic pump-side input port and the drain port being shut off by the second land. Electromagnetic pumps typically have lower discharge capability than mechanical pumps. Accordingly, if oil pumped from the electromagnetic pump leaks from the first oil chamber to the second oil chamber, device efficiency may be reduced, or the electromagnetic pump may need to be increased in size in order to ensure a required oil pressure.

It is a primary object of an oil supply device of preferred embodiments to suppress leakage of oil pumped from a pump.

The oil supply device of preferred embodiments takes the following measures in order to achieve the above primary object.

The oil supply device of preferred embodiments is an oil supply device that supplies oil, characterized by including: a pump that pumps oil; and a spool switch valve that has a spool in which a first land and a second land are coupled in an axial direction at a predetermined interval therebetween, and a housing accommodating the spool so that the spool can move in the axial direction, having an input port that receives the oil pumped from the pump, an output port that outputs the received oil, and a drain port that discharges the received oil, and having a first oil chamber defined therein by opposing surfaces of the first land and the second land. In the oil supply device, the spool has the plurality of lands so that when located at a first position, the spool seals between the input port and the output port by the second land and allows the input port to communicate with the drain port, and when located at a second position, the spool allows the input port to communicate with the output port via the first oil chamber and seals between the input port and the drain port by the second land, the housing has a first seal surface on a same circumference as that on which the drain port is formed, and when located at the second position, the spool seals the first seal surface by the second land.

The oil supply device of a preferred embodiment is configured such that, in the spool switch valve that has the spool in which the first land and the second land are coupled in the axial direction at the predetermined interval therebetween, and the housing accommodating the spool so that the spool can move in the axial direction, having the input port that receives the oil pumped from the pump, the output port that outputs the received oil, and the drain port that discharges the received oil, and having the first oil chamber defined therein by the opposing surfaces of the first land and the second land, the spool has the plurality of lands so that when located at the first position, the spool seals between the input port and the output port by the second land and allows the input port to communicate with the drain port, and when located at the second position, the spool allows the input port to communicate with the output port via the first oil chamber and seals between the input port and the drain port by the second land. The first seal surface is formed on the same circumference of the housing as that on which the drain port is formed. When located at the second position, the spool seals the first seal surface by the second land.

Accordingly, when the spool is located at the second position, the first seal surface formed on the same circumference as that on which the drain port is formed is sealed by the second land. This can suppress outflow of the oil in the first oil chamber that allows the first input port to communicate with the output port into the drain port. This can reduce the amount of oil leakage, and thus can further improve device efficiency and reduce the overall device size. When the spool is located at the first position, the oil pumped from the pump can be discharged via the input port and the drain port. Accordingly, even if air etc. is present in the oil passage from the pump to the input port, the air etc. can be discharged.

In the oil supply device of invention preferred embodiment, the input port may have a first input port and a second input port which receive the oil pumped from the pump. When located at the first position, the spool may seal between the first input port and the output port by the second land and allow the second input port to communicate with the drain port, and when located at the second position, the spool may allow the first input port to communicate with the output port via the first oil chamber and seal between the second input port and the drain port by the second land. The second input port may be formed on the same circumference as that on which the drain port is formed.

In the oil supply device according to this aspect of invention preferred embodiment, the second input port and the drain port may be formed so that an oil inflow direction and an oil outflow direction form an angle larger than 90 degrees and smaller than 270 degrees about an axis of the spool. Since the spool is pressed to one side by an oil pressure received from the second input port, clearance between an outer surface of the spool and an inner surface of the housing around the drain port can be reduced. As a result, oil leakage to the drain port can be more effectively suppressed. As used herein, the "predetermined angle" may be any angle that is larger than 90 degrees and smaller than 270 degrees. However, the closer the angle is to 180 degrees, the larger the force that presses the spool is. Accordingly, the effect of suppressing oil leakage to the drain port is enhanced as the angle is closer to 180 degrees.

In the oil supply device of the preferred embodiment, the pump may be an electric pump that is supplied with electric power to pump the oil. As used herein, the "electric pump" may be an electromagnetic pump that generates an oil pressure by reciprocating a piston by switching on and off an electromagnetic force. The oil supply device according to this aspect of the preferred embodiment may further include: a mechanical pump that is operated by power from a motor to generate an oil pressure. The housing may have a third input port that receives the oil pressure from the mechanical pump. When located at the first position, the spool may further allow the third input port to communicate with the output port via the first oil chamber, and when located at the second position, the spool may further seal between the third input port and the output port by the first land. The housing may have a second seal surface on a same circumference as that on which the third input port is formed. When located at the first position, the spool may seal the second seal surface by the first land. In this case, when the spool is located at the second position, outflow of the oil in the first oil chamber that allows the input port receiving the oil pumped from the electric pump to communicate with the output port into the third input port can be suppressed, and the amount of oil leakage can further be reduced.

BEST MODES

A mode based on a preferred embodiment will be described below.

Figure 1:
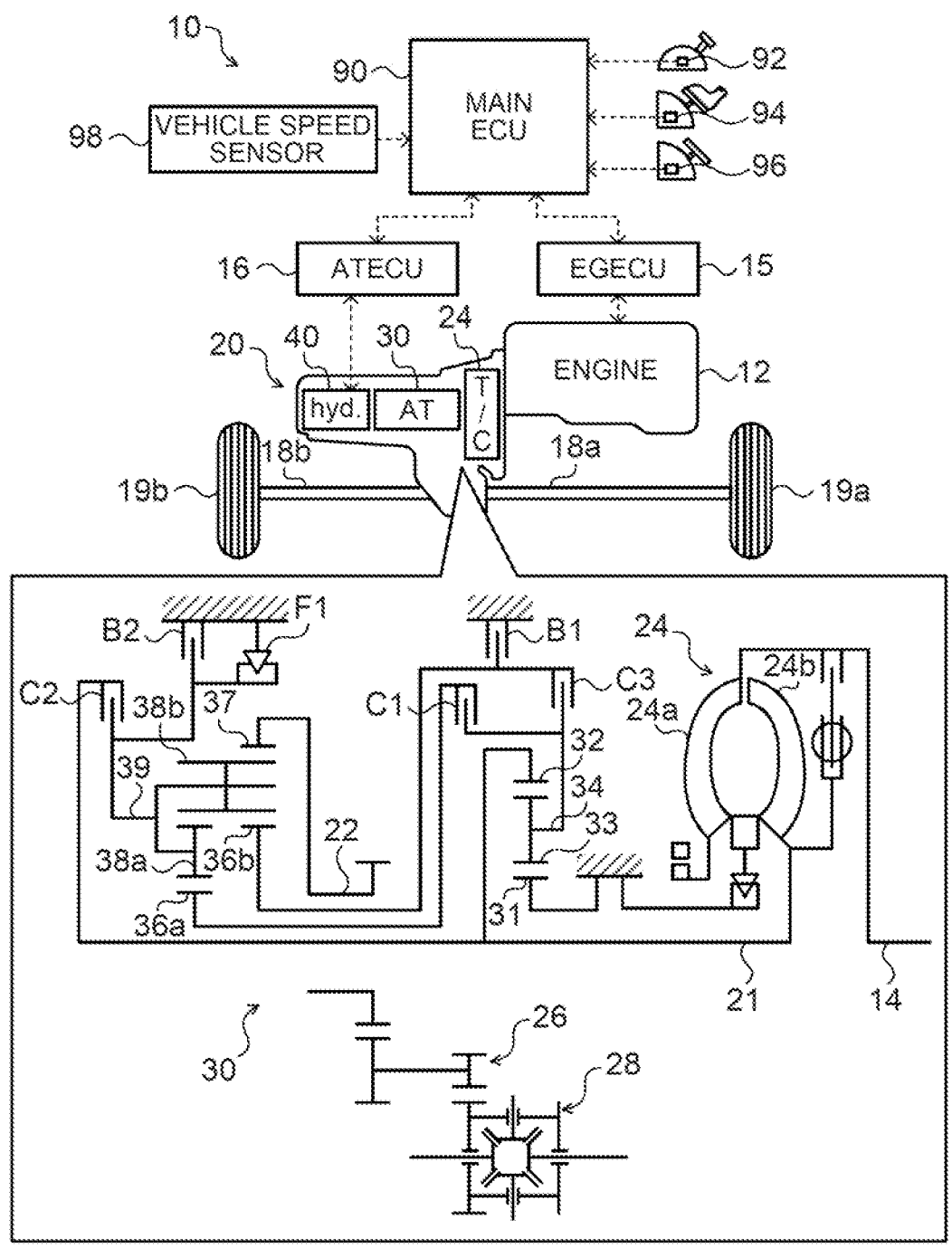
FIG. 1 is a configuration diagram schematically showing the configuration of an automobile 10 on which an engine 12 and a power transmission device 20 are mounted.
Figures 2, 3:
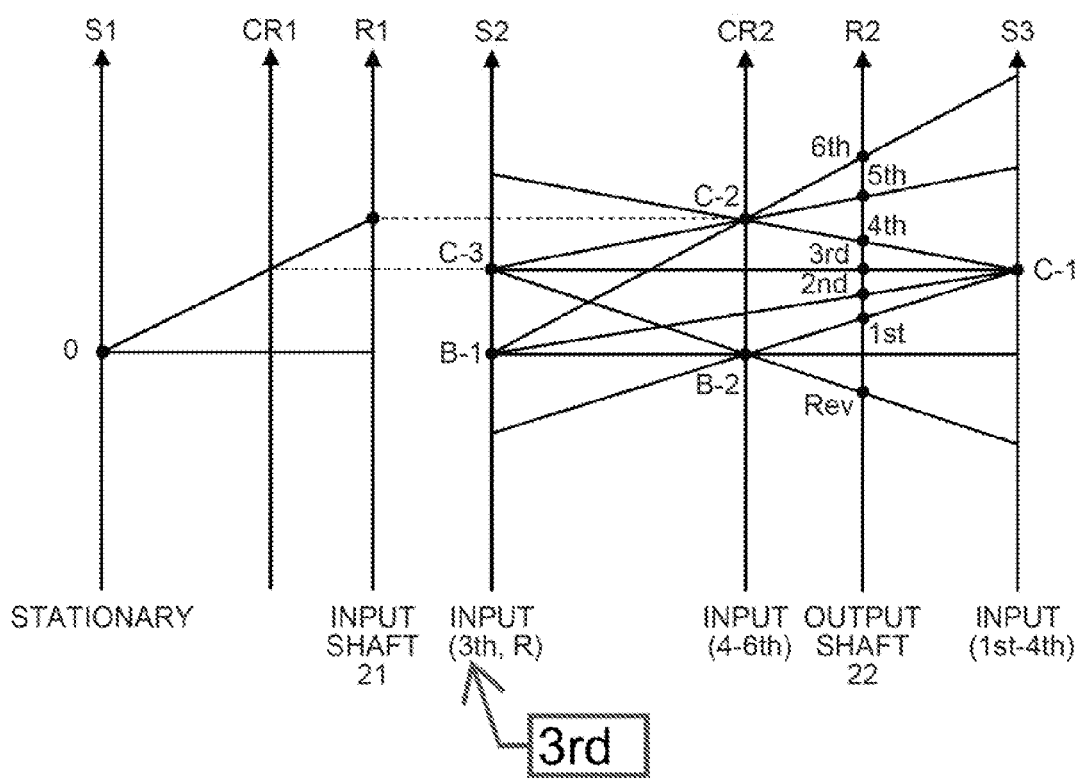
FIG. 2 is an illustration showing an operation table of an automatic transmission 30.
FIG. 3 is a collinear diagram showing the relation of the rotational speed among rotary elements of the automatic transmission 30.

FIG. 1 is a configuration diagram schematically showing the configuration of an automobile 10 on which an engine 12 and a power transmission device 20 are mounted. FIG. 2 is an illustration showing an operation table of an automatic transmission 30.

As shown in FIG. 1, the automobile 10 includes: the engine 12 as an internal combustion engine that outputs power by explosive combustion of hydrocarbon fuel such as gasoline or light oil; an engine electronic control unit (engine ECU) 15 that controls operation of the engine 12; the power transmission device 20 that is connected to a crankshaft 14 of the engine 12 and connected to axles 18a, 18b of right and left wheels 19a, 19b to transmit the power from the engine 12 to the axles 18a, 18b; an automatic transmission electronic control unit (ATECU) 16 that controls the power transmission device 20; and a main electronic control unit (main ECU) 90 that controls the entire vehicle. The main ECU 90 receives via input ports a shift position SP from a shift position sensor 92, an accelerator operation amount Acc from an accelerator pedal position sensor 94, a brake switch signal BSW from a break switch 96, a vehicle speed V from a vehicle speed sensor 98, etc. The main ECU 90 is connected to the engine ECU 15 and the ATECU 16 via communication ports to output and receive various control signals and data to and from the engine ECU 15 and the ATECU 16.

As shown in FIG. 1, the power transmission device 20 includes: a torque converter 24 with a lockup clutch which is formed by an input-side pump impeller 24a connected to the crankshaft 14 of the engine 12 and an output-side turbine runner 24b; the stepped automatic transmission 30 that has an input shaft 21 connected to the turbine runner 24b of the torque converter 24 and an output shaft 22 connected to the axles 18a, 18b via a gear mechanism 26 and a differential gear 28, and that shifts power received by the input shaft 21 to output the shifted power to the output shaft 22; and a hydraulic circuit 40 serving as the oil supply device of the preferred embodiment which supplies oil (hydraulic oil) required for operation of the torque converter 24 and the automatic transmission 30. In the embodiment, the torque converter 24 is interposed between the crankshaft 14 of the engine 12 and the automatic transmission 30. However, the preferred embodiment is not limited to this, and various starting devices can be used.

The automatic transmission 30 is configured as a 6-speed stepped automatic transmission, and includes a single-pinion type planetary gear mechanism, a Ravigneaux type planetary gear mechanism, three clutches C1, C2, C3, two brakes B1, B2, and a one-way clutch F1. The single-pinion type planetary gear mechanism includes a sun gear 31 serving as an external gear, a ring gear 32 serving as an internal gear which is disposed concentrically with the sun gear 31, a plurality of pinion gears 33 that mesh with the sun gear 31 and mesh with the ring gear 32, and a carrier 34 that holds the plurality of pinion gears 33 so that the pinion gears 33 can rotate and revolve. The sun gear 31 is fixed to a case, and the ring gear 32 is connected to the input shaft 21. The Ravigneaux type planetary gear mechanism includes: two sun gears 36a, 36b serving as external gears; a ring gear 37 serving as an internal gear; a plurality of short pinion gears 38a that mesh with the sun gear 36a; a plurality of long pinion gears 38b that mesh with the sun gear 36b and the plurality of short pinion gears 38a and mesh with the ring gear 37; and a carrier 39 that couples the plurality of short pinion gears 38a and the plurality of long pinion gears 38b and holds the plurality of short pinion gears 38a and the plurality of long pinion gears 38b so that the plurality of short pinion gears 38a and the plurality of long pinion gears 38b can rotate and revolve. The sun gear 36a is connected to the carrier 34 of the single-pinion type planetary gear mechanism via the clutch C1. The sun gear 36b is connected to the carrier 34 via the clutch C3 and is connected to the case via the brake B1. The ring gear 37 is connected to the output shaft 22, and the carrier 39 is connected to the input shaft 21 via the clutch C2. The carrier 39 is connected to the case via the one-way clutch F1, and is connected to the case via the brake B2 provided in parallel with the one-way clutch F1.

As shown in FIG. 2, the automatic transmission 30 can switch among first to sixth forward speeds, a reverse speed, and a neutral state by combination of on and off (engagement and disengagement) of the clutches C1 to C3 and on and off of the brakes B1, B2. The reverse speed can be attained by turning on the clutch C3 and the brake B2 and turning off the clutches C1, C2 and the brake B1. The first forward speed can be attained by turning on the clutch C1 and turning off the clutches C2, C3 and the brakes B1, B2. At the first forward speed, the brake B2 is turned on when engine brake is in operation. The second forward speed can be attained by turning on the clutch C1 and the brake B1 and turning off the clutches C2, C3 and the brake B2. The third forward speed can be attained by turning on the clutches C1, C3 and turning off the clutch C2 and the brakes B1, B2. The fourth forward speed can be attained by turning on the clutches C1, C2 and turning off the clutch C3 and the brakes B1, B2. The fifth forward speed can be attained by turning on the clutches C2, C3 and turning off the clutch C1 and the brakes B1, B2. The sixth forward speed can be attained by turning on the clutch C2 and the brake B1 and turning off the clutches C1, C3 and the brake B2. The neutral state can be attained by turning off all of the clutches C1 to C3 and the brakes B1, B2. FIG. 3 is a collinear diagram showing the relation of the rotational speed among the rotary elements at each shift speed of the automatic transmission 30. In the figure, S1-axis represents the rotational speed of the sun gear 31, CR1-axis represents the rotational speed of the carrier 34, R1-axis represents the rotational speed of the ring gear 32, S2-axis represents the rotational speed of the sun gear 36b, S3-axis represents the rotational speed of the sun gear 36a, CR2-axis represents the rotational speed of the carrier 39, and R2-axis represents the rotational speed of the ring gear 37.

Figure 4:
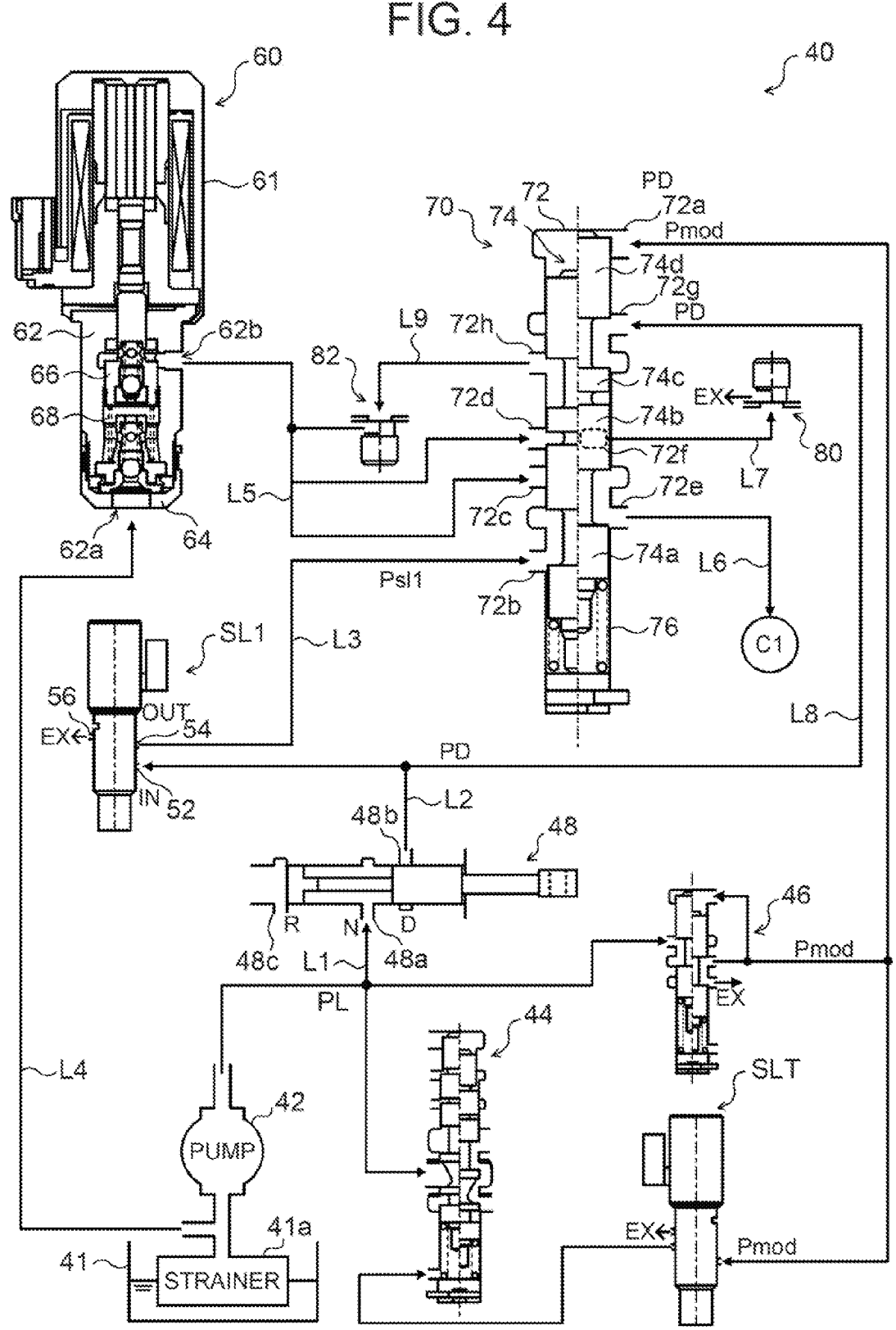
FIG. 4 is a configuration diagram schematically showing the configuration of a hydraulic circuit 40 that controls the power transmission device 20.

The clutches C1 to C3 and the brakes B1, B2 in the automatic transmission 30 are turned on and off (engaged and disengaged) by the hydraulic circuit 40 shown by way of example in FIG. 4. As shown in FIG. 4, the hydraulic circuit 40 is formed by components such as: a mechanical oil pump 42 that is operated by the power from the engine 12 to suck hydraulic oil stored in an oil pan 41 via a strainer 41a and pump the sucked hydraulic oil to a line pressure oil passage L1; a regulator valve 44 that regulates the pressure of the hydraulic oil pumped from the mechanical oil pump 42 to generate a line pressure PL; a modulator valve 46 that reduces the line pressure PL to a fixed pressure to generate a modulator pressure Pmod; a linear solenoid valve SLT that regulates the modulator pressure Pmod and outputs the regulated pressure as a signal pressure to drive the regulator valve 44; a manual valve 48 that has an input port 48a connected to the line pressure oil passage L1, a drive (D) position output port 48b connected to a drive pressure oil passage L2, a reverse (R) position output port 48c, etc. and that allows corresponding ones of the ports to communicate with each other or shuts off communication between corresponding ones of the ports according to the shift position; a normally closed linear solenoid valve SL1 that has an input port 52 connected to the drive pressure oil passage L2, an output port 54 connected to an output port oil passage L3, and a drain port 56, and that receives hydraulic oil in the drive pressure oil passage L2 via the input port 52 and drains a part of the hydraulic oil from the drain port 56 to regulate the pressure of the received hydraulic oil, and outputs the regulated pressure from the output port 54; an electromagnetic pump 60 that has a suction port 62a connected to the strainer 41a via a suction port oil passage L4 and a discharge port 62b connected to a discharge port oil passage L5, and that reciprocates a piston 66 by an electromagnetic force to suck hydraulic oil from the suction port 62a and discharge the sucked hydraulic oil from the discharge port 62b; a C1 relay valve 70 that selectively switches between a mode in which an SL1 pressure Psl1 as an output pressure from the linear solenoid valve SL1 is supplied to a C1 oil passage L6 connected to a hydraulic servo (oil chamber) of the clutch C1 and a mode in which a discharged pressure from the electromagnetic pump 60 is supplied to the C1 oil passage L6; and a damper, not shown, which is connected to the C1 oil passage L6 and suppresses fluctuation of the oil pressure that is applied to the hydraulic servo of the clutch C1. Although FIG. 4 shows only an oil pressure supply system for the clutch C1, oil pressure supply systems for the clutches C2, C3 and the brakes B1, B2 can be similarly configured by well-known solenoid valves and relay valves. The linear solenoid valves SLT, SL1, the electromagnetic pump 60, etc. are operated by drive control by the ATECU 16.

When a shift lever is shifted to a drive (D) position, the manual valve 48 allows the input port 48a and the D position output port 48b to communicate with each other, and shuts off communication between the input port 48a and the R position output port 48c. When the shift lever is shifted to a reverse (R) position, the manual valve 48 shuts off communication between the input port 48a and the D position output port 48b and allows the input port 48a and the R position output port 48c to communicate with each other. When the shift lever is shifted to a neutral (N) position, the manual valve 48 shuts off communication between the input port 48a and the D position output port 48b and between the input port 48a and the R position output port 48c.

The drive pressure oil passage L2 is connected to the discharge port oil passage L5 via a bypass oil passage. The bypass oil passage is formed by an upstream side L8 connected to the drive pressure oil passage L2 and a downstream side L9 connected to the discharge port oil passage L5, and the C1 relay valve 70 is interposed between the upstream side L8 and the downstream side L9. A check valve 82 is attached to the downstream side L9 of the bypass oil passage. The check valve 82 allows oil to flow out from the downstream side L9 of the bypass oil passage to the discharge port oil passage L5, but does not allow oil to flow from the discharge port oil passage L5 into the downstream side L9 of the bypass oil passage.

Figure 5:
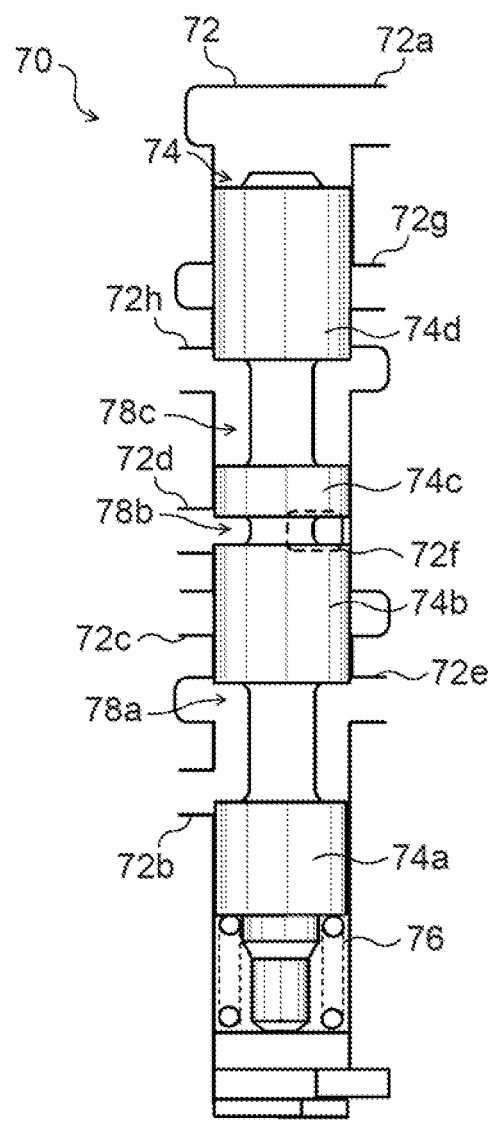
FIG. 5 is an illustration showing the state of a C1 relay valve 70 of an embodiment in the case where a signal pressure is equal to or higher than a set pressure.
Figure 6:
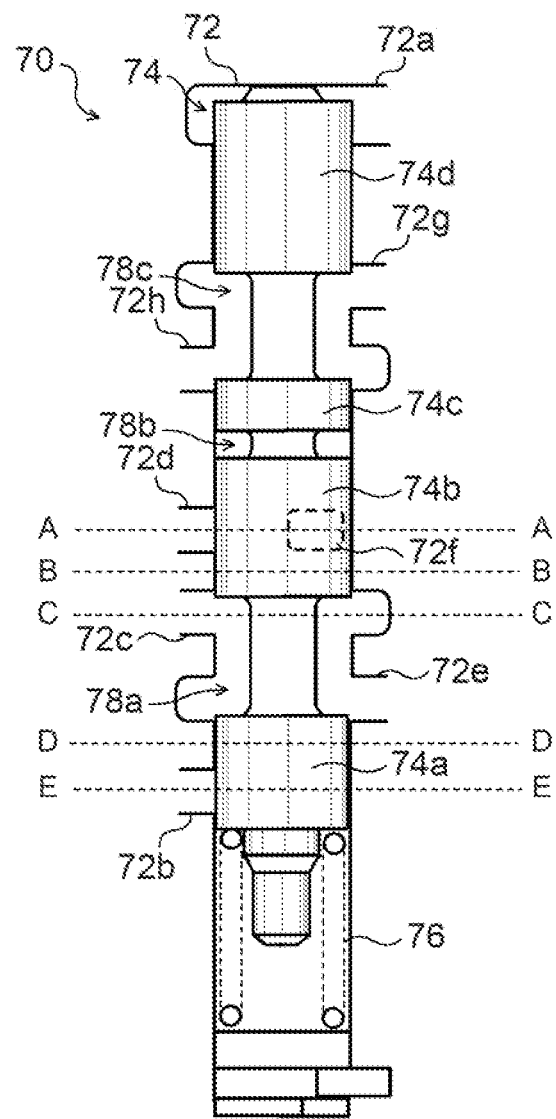
FIG. 6 is an illustration showing the state of the C1 relay valve 70 of the embodiment in the case where the signal pressure is lower than the set pressure.
Figure 7A:
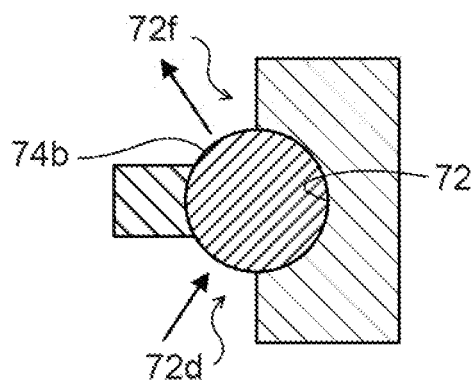
FIG. 7 shows sectional views of the C1 relay valve 70 of FIG. 6.
Figure 7D:
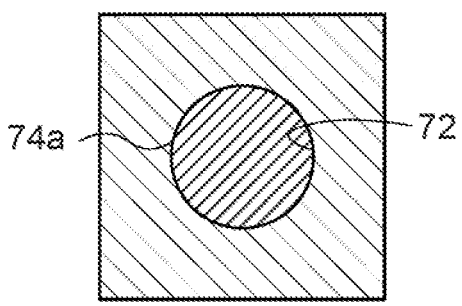
Figure 7B:
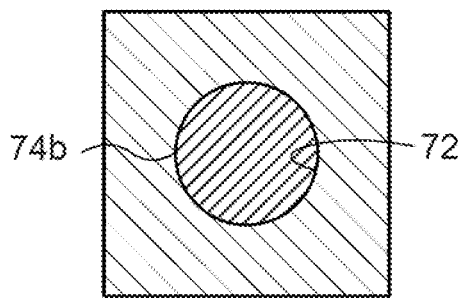
Figure 7E:
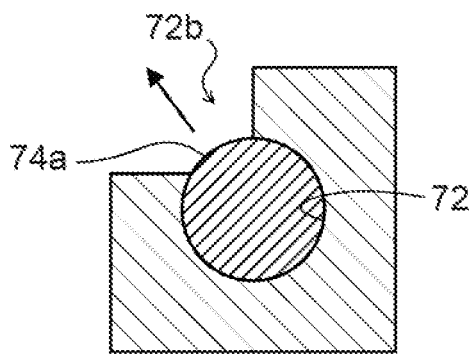
Figure 7C:
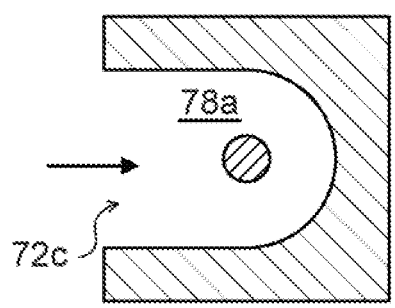

The C1 relay valve 70 is configured as a spool relay valve including a sleeve 72 having various ports, a spool 74 that slides in the axial direction in the sleeve 72 to allow corresponding ones of the ports to communicate with each other and shut off communication between corresponding ones of the ports, and a spring 76 that presses a spool end face in the axial direction. The sleeve 72 has as various ports: a signal pressure port 72a that receives the modulator pressure Pmod as a signal pressure that presses a spool end face in the opposite direction from that of the biasing force of the spring 76; an input port 72b that is connected to the output port oil passage L3 and receives the SL1 pressure Psl1; an input port 72c that is connected to the discharge port oil passage L5 and receives a discharge pressure from the electromagnetic pump 60; an input port 72d that is connected to the discharge port oil passage L5 and receives the discharge pressure from the electromagnetic pump 60; an output port 72e that is connected to the C1 oil passage L6; a drain port 72f that is connected to a drain oil passage L7 having a check valve 80 attached thereto; a connection port 72g that is connected to the upstream side L8 of the bypass oil passage branching from the drive pressure oil passage L2; and a connection port 72h that is connected to the downstream side L9 of the bypass oil passage. The various ports are formed in the order of the input port 72b, the output port 72e, the input port 72c, the input port 72d and the drain port 72f, the connection port 72h, the connection port 72g, and the signal pressure port 72a from the side closer to the spring 76. FIGS. 5 and 6 show the states of the C1 relay valve 70. FIG. 5 shows the state of the C1 relay valve 70 in the case where the signal pressure is equal to or higher than a set pressure, and FIG. 6 shows the state of the C1 relay valve 70 in the case where the signal pressure is lower than the set pressure.

As shown in FIGS. 5 and 6, the spool 74 includes four lands 74a to 74d coupled to each other in the axial direction. The four lands 74a to 74d are coupled at predetermined intervals in the order of the first land 74a, the second land 74b, the third land 74c, and the fourth land 74d from the side closer to the spring 76. The second land 74b has a longer axial length than the third land 74c, and the interval between the second land 74b and the third land 74c is smaller than that between the first land 74a and the second land 74b and that between the third land 74c and the fourth land 74d. When accommodated in the sleeve 72, the spool 74 defines a first oil chamber 78a by the space surrounded by the opposing surfaces of the first land 74a and the second land 74b, defines a second oil chamber 78b by the space surrounded by the opposing surfaces of the second land 74b and the third land 74c, and defines a third oil chamber 78c by the space surrounded by the opposing surfaces of the third land 74c and the fourth land 74d.

FIG. 7 shows sectional views of the C1 relay valve 70 of FIG. 6. FIG. 7A is a sectional view taken along line A-A in FIG. 6, FIG. 7B is a sectional view taken along line B-B in FIG. 6, FIG. 7C is a sectional view taken along line C-C in FIG. 6, FIG. 7D is a sectional view taken along line D-D in FIG. 6, and FIG. 7E is a sectional view taken along line E-E in FIG. 6. As shown in the figure, the input port 72d and the drain port 72f are formed on the same circumference of the sleeve 72 so as to be separated from each other by a predetermined angle about the axis of the spool 74, and to open in an arc shape. In the present embodiment, the input port 72d and the drain port 72f are formed so that the direction in which oil flows into the input port 72d and the direction in which oil flows out from the drain port 72f form an angle of 120 degrees to 150 degrees about the axis of the spool 74. The input port 72c is formed so as to open along the entire circumference of the inner peripheral surface of the sleeve 72 (see FIG. 7C). Although not shown in the figure, the output port 72e is also formed so as to open along the entire circumference of the inner peripheral surface of the sleeve 72, like the input port 72c. The input port 72b is formed on a part in the circumferential direction of the sleeve 72 so as to open in an arc shape (see FIG. 7E). The opening areas of the input port 72d, the drain port 72f, and the input port 72b are therefore smaller than those of the input port 72c and the output port 72e which are interposed between the input port 72b and the input port 72d and the drain port 72f. The sleeve 72 has, on the same circumference as that on which the input port 72d and the drain port 72f are formed, a sliding surface (first seal surface) on which the second land 74b can slide (see FIG. 7A). The sleeve 72 also has, on the same circumference as that on which the input port 72b is formed, a sliding surface (second seal surface) on which the first land 74a can slide (see FIG. 7E). The sleeve 72 further has, as a sliding surface on which the second land 74b can slide, a seal surface formed between the input port 72c and the drain port 72f (input port 72d) so as to extend along the entire circumference and to adjoin the first seal surface (see FIG. 7B). The sleeve 72 further has, as a sliding surface on which the first land 74a can slide, a seal surface formed between the input port 72b and the output port 72e so as to extend along the entire circumference and to adjoin the second seal surface (see FIG. 7D).

In the C1 relay valve 70 having the above configuration, when a signal pressure (modulator pressure Pmod) that is equal to or higher than a pressure (set pressure) that overcomes the biasing force of the spring 76 is applied to the signal pressure port 72a, the spool 74 is moved by the modulator pressure Pmod in such a direction that the spring 76 is compressed, so that the C1 relay valve 70 is in the state (first position) shown in FIG. 5. In this state, the spool 74 allows the input port 72b to communicate with the output port 72e via the first oil chamber 78a, and closes the input port 72c by the second land 74b to shut off communication between the input port 72c and the output port 72e. Moreover, the spool 74 allows the input port 72d to communicate with the drain port 72f via the second oil chamber 78b, and closes the connection port 72g by the fourth land 74d to shut off communication between the connection ports 72g, 72h. Accordingly, the output port 54 of the linear solenoid valve SL1 communicates with the hydraulic servo (oil chamber) of the clutch C1 sequentially via the output port oil passage L3, the input port 72b, the first oil chamber 78a, the output port 72e, and the C1 oil passage L6, and communication between the discharge port 62b of the electromagnetic pump 60 and the hydraulic servo of the clutch C1 is shut off. Moreover, the discharge port 62b of the electromagnetic pump 60 communicates with the check valve 80 via the discharge port oil passage L5, the input port 72d, the second oil chamber 78b, the drain port 72f, and the drain oil passage L7, and communication between the upstream side L8 of the bypass oil passage and the downstream side L9 of the bypass oil passage is shut off. When the signal pressure (modulator pressure Pmod) that is equal to or higher than the pressure (set pressure) that overcomes the biasing force of the spring 76 is not applied to the signal pressure port 72a, the spool 74 is moved by the biasing force of the spring 76 in such a direction that the spring 76 is extended, so that the C1 relay valve 70 is in the state (second position) shown in FIG. 6. In this state, the spool 74 closes the input port 72b by the first land 74a to shut off communication between the input port 72b and the output port 72e, and allows the input port 72c to communicate with the output port 72e via the first oil chamber 78a. Moreover, the spool 74 closes both the input port 72d and the drain port 72f by the second land 74b to shut off communication between the input port 72d and the drain port 72f, and allows the connection ports 72g, 72h to communicate with each other via the third oil chamber 78c. Accordingly, communication between the output port 54 of the linear solenoid valve SL1 and the hydraulic servo (oil chamber) of the clutch C1 is shut off, and the discharge port 62b of the electromagnetic pump 60 communicates with the hydraulic servo of the clutch C1 sequentially via the discharge port oil passage L5, the input port 72c, the first oil chamber 78a, the output port 72e, and the C1 oil passage L6. Moreover, communication between the discharge port 62b of the electromagnetic pump 60 and the drain oil passage L7 is shut off, and the drive pressure oil passage L2 communicates with the discharge port oil passage L5 via the upstream side L8 of the bypass oil passage, the connection port 72g, the third oil chamber 78c, the connection port 72h, the downstream side L9 of the bypass oil passage, and the check valve 82.

As shown in the figure, the electromagnetic pump 60 is configured as a piston pump, which includes: a solenoid 61 that generates an electromagnetic force; a cylinder 62 having a hollow cylindrical shape; the piston 66 that is inserted in the cylinder 62 and is capable of sliding when pressed by the electromagnetic force from the solenoid 61; an end plate 64 attached to an end of the cylinder 62; and a spring 68 that is interposed between the end plate 64 and the piston 66 to apply a biasing force to the piston 66 in the opposite direction to that of the electromagnetic force of the solenoid 61, and which generates an oil pressure by intermittently driving the solenoid 61 to reciprocate the piston 66. The end plate 64 contains a suction check valve that allows hydraulic oil to flow into the electromagnetic pump 60 from the suction port 62a, but does not allow hydraulic oil to flow in the opposite direction. The piston 66 contains a discharge check valve that allows hydraulic oil to flow out of the electromagnetic pump 60 from the discharge port 62b, but does not allow hydraulic oil to flow in the opposite direction. Discharge capability (electromagnetic force of the solenoid 61, pump capacity, etc.) of the electromagnetic pump 60 of the present embodiment is determined so that the hydraulic servo of the clutch C1 is held at a predetermined standby pressure higher than a piston stroke end pressure.

Although not shown in detail in the figure, the check valve 80 is formed by a valve housing having formed therein a discharge port of the drain oil passage L7, a valve body accommodated in the valve housing, and a valve spring that applies to the valve body a biasing force that presses a pressure-receiving surface of the valve body against the discharge port. In this check valve 80, when an oil pressure equal to or higher than a pressure (set pressure) that overcomes the biasing force of the valve spring is applied to the drain oil passage L7, the discharge port is opened to drain hydraulic oil in the drain oil passage L7. When the oil pressure equal to or higher than the pressure (set pressure) that overcomes the biasing force of the valve spring is not applied to the drain oil passage L7, the discharge port is closed so as not to allow the hydraulic oil in the drain oil passage L7 to be drained. Accordingly, air in the electromagnetic pump 60 and air in the discharge port oil passage L5 can be discharged from the discharge port via the drain oil passage L7 and the check valve 80 by operating the electromagnetic pump 60 with the C1 relay valve 70 allowing the discharge port oil passage L5 to communicate with the drain oil passage L7. Due to the backflow preventing function of the check valve 80, air is prevented from flowing into the discharge port oil passage L5 from the discharge port. Moreover, when the C1 relay valve 70 shuts off communication between the discharge port oil passage L5 and the drain oil passage L7, the discharge port oil passage L5 does not communicate with the discharge port, and hydraulic oil discharged from the electromagnetic pump 60 therefore does not flow out from the discharge port.

Operation of the automobile 10 of the embodiment configured as described above will be described. In the embodiment, the engine 12 is automatically stopped if all of preset automatic stop conditions, such as a vehicle speed V being 0, accelerator off, and a brake switch signal BSW being on, are satisfied while the automobile 10 is traveling with the shift lever being at D position. If the engine 12 is automatically stopped, the automatically stopped engine 12 is automatically started if preset automatic start conditions such as the brake switch signal BSW being off are satisfied thereafter. Automatic start control and automatic stop control for the engine 12 are performed by the main ECU 90 by determining if the automatic start conditions or the automatic stop conditions are satisfied or not in response to various detection signals, and sending a control command according to the determination result to the engine ECU 15 and the ATECU 16.

If the automatic stop conditions are satisfied and the engine 12 is automatically stopped, the line pressure PL (modulator pressure Pmod) gradually decreases with a decrease in rotational speed of the engine 12. When the modulator pressure Pmod becomes lower than the set pressure of the C1 relay valve 70, the C1 relay valve 70 switches from the state where the output port 54 of the linear solenoid valve SL1 communicates with the hydraulic servo of the clutch C1 to the state where the discharge port 62b of the electromagnetic pump 60 communicates with the hydraulic servo of the clutch C1. Accordingly, the engagement pressure of the clutch C1 can be held at a predetermined pressure or more by operating the electromagnetic pump 60. When the C1 relay valve 70 is in the state where the output port 54 of the linear solenoid valve SL1 communicates with the hydraulic servo of the clutch C1, the discharge port 62b of the electromagnetic pump 60 communicates with the drain oil passage L7. Accordingly, air in the electromagnetic pump 60 and in the discharge port oil passage L5 can be discharged from the check valve 80 via the drain oil passage L7 by starting operation of the electromagnetic pump 60 before the state of the C1 relay valve 70 is switched (before the modulator pressure Pmod becomes lower than the set pressure). If the automatic start conditions for the engine 12 are satisfied, cranking of the engine 12 is started by a starter motor, not shown, and the line pressure PL (modulator pressure Pmod) increases with an increase in rotational speed of the engine 12. At this time, the C1 relay valve 70 allows the discharge port 62b of the electromagnetic pump 60 to communicate with the hydraulic servo of the clutch C1 and shuts off communication between the output port 54 of the linear solenoid valve SL1 and the clutch C1 until the modulator pressure Pmod becomes equal to or higher than the set pressure. Accordingly, the SL1 pressure Psl1 from the linear solenoid valve SL1 cannot be supplied to the hydraulic servo of the clutch C1 during this period. However, when the C1 relay valve 70 is in this state, the drive pressure oil passage L2 communicates with the discharge port oil passage L5 via the upstream side L8 of the bypass oil passage, the connection port 72g, the third oil chamber 78c, the connection port 72h, the downstream side L9 of the bypass oil passage, and the check valve 82. Accordingly, the line pressure PL (drive pressure PD) is introduced into the discharge port oil passage L5, and is supplied from the discharge port oil passage L5 to the hydraulic servo of the clutch C1 via the input port 72c, the first oil chamber 78a, the output port 72e, and the C1 oil passage L6. When the modulator pressure Pmod becomes equal to or higher than the set pressure, the C1 relay valve 70 allows the output port 54 of the linear solenoid valve SL1 to communicate with the clutch C1. Accordingly, the SL1 pressure Psl1 from the linear solenoid valve SL1 is applied to the hydraulic servo of the clutch C1, and the clutch C1 is fully engaged. As described above, while the engine 12 is in the automatically stopped state, an oil pressure is supplied from the electromagnetic pump 60 to the hydraulic servo of the clutch C1 to cause the clutch C1 to stand by at a predetermined engagement pressure. The clutch C1 can thus be quickly engaged immediately after the engine 12 is automatically started. The automobile 10 can therefore be smoothly started.

Figure 8:
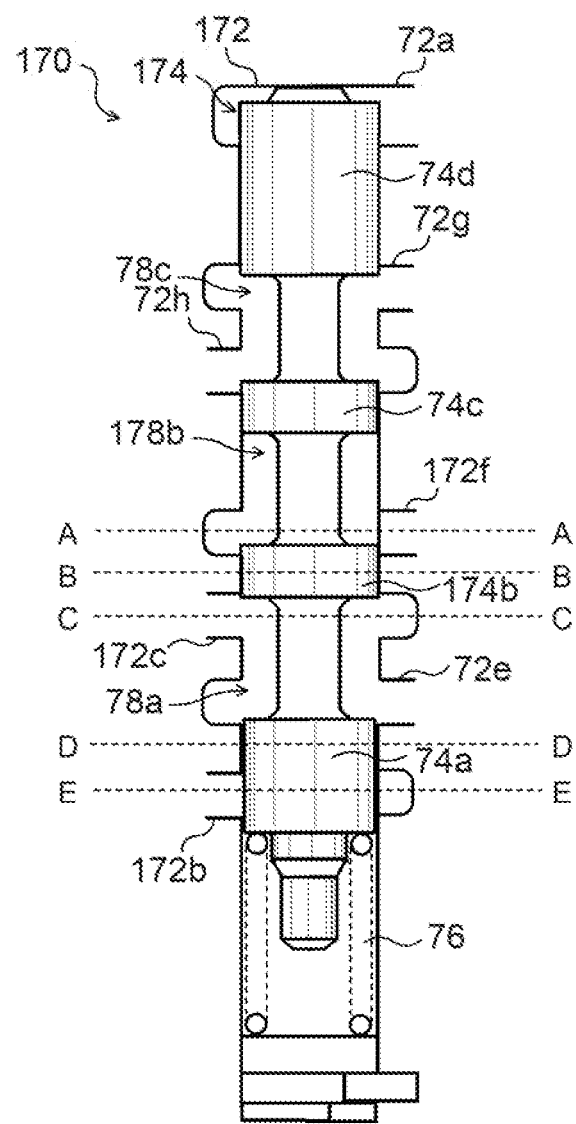
FIG. 8 is an illustration showing the state of a C1 relay valve 170 of a comparative example in the case where a signal pressure is lower than a set pressure.
Figure 9A:
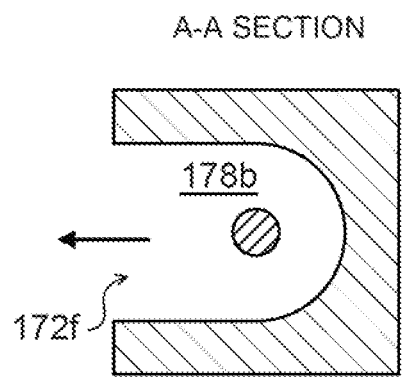
FIG. 9 shows sectional views of the C1 relay valve 170 of FIG. 8.
Figure 9D:
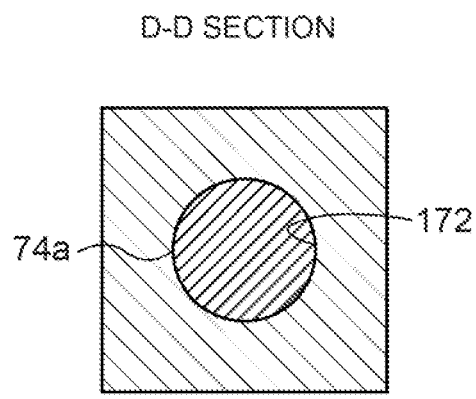
Figure 9B:
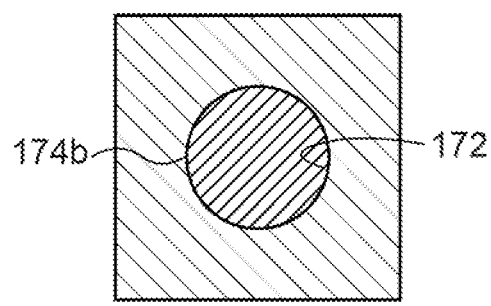
Figure 9E:
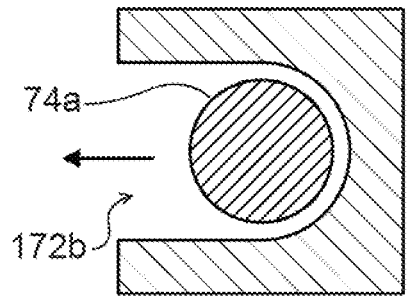
Figure 9C:
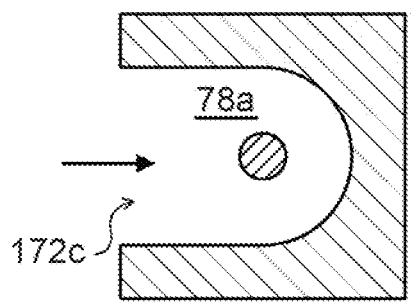

It is now assumed that the electromagnetic pump 60 is operated to supply its discharge pressure to the C1 oil passage L6 via the input port 72c, the first oil chamber 78a, and the output port 72e when the engine 12 is in a stopped state. In this case, the signal pressure (modulator pressure Pmod) is lower than the set pressure, and the C1 relay valve 70 of the embodiment is in the state shown in FIGS. 6 and 7. Namely, the C1 relay valve 70 closes the input port 72b by the first land 74a, and closes the drain port 72f by the second land 74b. The state of the C1 relay valve 70 of the embodiment will be described below in comparison with the state of a C1 relay valve 170 of a comparative example. FIG. 8 shows the state of the C1 relay valve 170 of the comparative example in the case where a signal pressure is lower than a set pressure, and FIG. 9 shows sectional views of the C1 relay valve 170 of FIG. 8. In the figures, the same configurations of the C1 relay valve 170 of the comparative example as those of the C1 relay valve 70 of the embodiment are denoted with the same reference characters, and repetitive description thereof will be omitted. In the C1 relay valve 170 of the comparative example, a sleeve 172 includes only one input port 172c as an input port that receives a discharge port from the electromagnetic pump 60. The input port 172c and a drain port 172f are not located on the same circumference, but are shifted from each other by a predetermined interval in the axial direction (see FIG. 8) and are formed so as to open along the entire circumference (see FIGS. 9A and 9C). An input port 172b is also formed so as to open along the entire circumference (see FIG. 9E). A spool 174 of the comparative example is configured so that the interval (second oil chamber 178b) between a second land 174b and the third land 74c is larger than in the spool 74 of the embodiment, and the axial length of the second land 174b is shorter than in the spool 74 of the embodiment so as to correspond to the interval between the input port 172c and the drain port 172f.

Both of the C1 relay valves 70, 170 are structured so that the spool 74, 174 is moved while causing the outer peripheral surfaces of the lands 74a to 74d to slide on the inner peripheral surface of the sleeve 72, 172. Due to this structure, there is slight clearance between the inner peripheral surface of the sleeve 72, 172 and the outer peripheral surfaces of the lands 74a to 74d. In the C1 relay valve 170 of the comparative example, the drain port 172f opens along the entire circumference and communicates with the drain oil passage L7. Accordingly, if the discharge pressure of the electromagnetic pump 60 is applied to the first oil chamber 78a, there may be a pressure difference between the first oil chamber 78a and the drain oil passage L7, and oil in the first oil chamber 78a may leak to the drain oil passage L7 via the drain port 172f. In the C1 relay valve 170 of the comparative example, the input port 172b opens along the entire circumference and communicates with the output port oil passage L3. Moreover, when in an off state, the normally closed linear solenoid valve SL1 allows the output port 54 connected to the output port oil passage L3 to communicate with the drain port 56. Accordingly, if the discharge pressure of the electromagnetic pump 60 is applied to the first oil chamber 78a, there may be a pressure difference between the first oil chamber 78a and the output port oil passage L3, and oil in the first oil chamber 78a may leak to the output port oil passage L3 via the input port 172b. Such oil leakage causes reduction in oil pressure in the first oil chamber 78a, and also causes reduction in engagement pressure of the clutch C1.

On the other hand, in the C1 relay valve 70 of the embodiment, the sleeve 72 has the two input ports 72c, 72d as ports that receive the discharge pressure of the electromagnetic pump 60, and the drain port 72f formed on the same circumference as that on which the input port 72d is formed and having a smaller opening area than the input port 72c and the output port 72e. In other words, the sliding surface (first seal surface) on which the second land 74b can slide is formed on the same circumference as that on which the input port 72d and the drain port 72f are formed. The axial length of the second land 74b is set so that the input port 72c can be closed by the second land 74b when the signal pressure is equal to or higher than the set pressure, and that the input port 72d and the drain port 72f can be closed by the second land 74b when the signal pressure is lower than the set pressure. Accordingly, when the second land 74b closes the input port 72d and the drain port 72f, the sliding surface (first seal surface) formed on the same circumference as that on which the input port 72d and the drain port 72f are formed can reduce oil leakage from the first oil chamber 78a to the drain oil passage L7 as compared to the comparative example. In the C1 relay valve 70 of the embodiment, the input port 72b is formed so as to have a smaller opening area than the input port 72c and the output port 72e. In other words, the sliding surface (second seal surface) on which the first land 74a can slide is formed on the same circumference as that on which the input port 72b is formed. Accordingly, when the first land 74a closes the input port 72b, the sliding surface (second seal surface) formed on the same circumference as that on which the input port 72b is formed can reduce oil leakage from the first oil chamber 78a to the output port oil passage L3 as compared to the comparative example.

In the C1 relay valve 70 of the embodiment, the input port 72d and the drain port 72f are formed so as to be separated from each other by the predetermined angle (the direction in which oil flows into the input port 72d and the direction in which oil flows out from the drain port 72f form an angle of 120 degrees to 150 degrees) about the axis of the spool 74, and to open in an arc shape. Accordingly, the spool 74 is pressed to one side by an oil pressure (side force) that is applied to the input port 72d, and the clearance between the sleeve 72 and the second land 74b around the drain port 72f is reduced. This can further reduce oil leakage from the first oil chamber 78a to the drain oil passage L7 and the output port oil passage L3.

According to the oil supply device of the above embodiment, the sleeve 72 has the two input ports 72c, 72d as ports that receive the discharge pressure of the electromagnetic pump 60, and the drain port 72f formed on the same circumference as that on which the input port 72d is formed and having a smaller opening area than the input port 72c and the output port 72e. That is, the sliding surface (first seal surface) on which the second land 74b can slide is formed on the same circumference as that on which the input port 72d and the drain port 72f are formed. The axial length of the second land 74b is set so that the input port 72c can be closed by the second land 74b when the signal pressure is equal to or higher than the set pressure, and that the input port 72d and the drain port 72f can be closed by the second land 74b when the signal pressure is lower than the set pressure. This can reduce oil leakage from the first oil chamber 78a to the drain oil passage L7 even if the discharge pressure of the electromagnetic pump 60 is applied to the first oil chamber 78a. Moreover, the input port 72b that receives the SL1 pressure Psl1 from the linear solenoid valve SL1 is formed so as to have a smaller opening area than the input port 72c and the output port 72e. That is, the sliding surface (second seal surface) on which the first land 74a can slide is formed on the same circumference as that on which the input port 72b is formed. This can reduce oil leakage from the first oil chamber 78a to the output port oil passage L3. As a result, oil leakage can be reduced, device efficiency can further be improved, and the size of the electromagnetic pump 60 and thus the overall device size can be reduced. Moreover, the input port 72d and the drain port 72f are formed so as to be separated from each other by the predetermined angle (the oil inflow direction and the oil outflow direction form an angle of 120 degrees to 150 degrees) about the axis of the spool 74, and to open in an arc shape. This can reduce the clearance between the sleeve 72 and the second land 74b around the drain port 72f, and can further reduce oil leakage from the first oil chamber 78a to the drain oil passage L7 and the output port oil passage L3.

The oil supply device of the embodiment is formed so that the direction in which oil flows into the input port 72d and the direction in which oil flows out from the drain port 72f form an angle of 120 degrees to 150 degrees. However, the preferred embodiment is not limited to this, and this angle may be any angle that is larger than 90 degrees and smaller than 270 degrees. The closer the angle is to 180 degrees, the larger the force that presses the spool is. Accordingly, the effect of suppressing oil leakage to the drain port is enhanced as the angle is closer to 180 degrees.

In the oil supply device of the embodiment, the input port 72b, the output port 72e, the input port 72c, and the input port 72d (drain port 72f) are arranged in this order in the axial direction in the sleeve 72 of the C1 relay valve 70. However, the order of the output port 72e and the input port 72c may be reversed. In this case, the output port 72e is closed by the second land 74b when the signal pressure (modulator pressure Pmod) is equal to or higher than the set pressure.

In the oil supply device of the embodiment, the drive pressure oil passage L2 is connected to the discharge port oil passage L5 via the bypass oil passage (the upstream side L8, the C1 relay valve 70, the downstream side L9, the check valve 82), but the oil supply device may not include the bypass oil passage. In this case, the oil supply device may not include the connection ports 72g, 72h and the fourth land 74d of the C1 relay valve and the check valve 82.

In the oil supply device of the embodiment, the check valve 80 is attached to the drain oil passage L7. However, the oil supply device may include any other on-off valve such as an on-off solenoid valve, instead of the check valve 80.

Correspondence between the main elements of the embodiment and the main elements of the invention described in the section "SUMMARY" will be described below. In the embodiment, the electromagnetic pump 60 corresponds to the "pump," the C1 relay valve 70 corresponds to the "switch valve," the first land 74a corresponds to the "first land," the second land 74b corresponds to the "second land," the input port 72c and the input port 72d correspond to the "input port," the output port 72e corresponds to the "output port," and the drain port 72f corresponds to the "drain port." The input port 72c corresponds to the "first input port," and the input port 72d corresponds to the "second input port." The electromagnetic pump 60 corresponds to the "electric pump." The mechanical oil pump 42 corresponds to the "mechanical pump," and the input port 72b corresponds to the "third input port."

As used herein, the "electric pump" is not limited to the electromagnetic pump 60, but may be any pump that is supplied with electric power to generate an oil pressure, such as an electric pump that is operated by power from an electric motor. The correspondence between the main elements of the embodiment and the main elements of the invention described in the section "SUMMARY" is shown by way of example in order to specifically describe the best mode for carrying out the invention described in the section "SUMMARY" based on the embodiment, and is not intended to limit the elements of the invention described in the section "SUMMARY." That is, the embodiment described in the section "SUMMARY" should be construed based on the description in the section "SUMMARY," and the embodiment is merely a specific example of the invention described in the section "SUMMARY."

Although the mode for carrying out the present invention is described above based on the embodiment, it should be understood that the present invention is not limited in any respect to the embodiment, and can be carried out in various forms without departing from the spirit and scope of the present invention.

INDUSTRIAL APPLICABILITY

The present invention is applicable to the manufacturing industry of oil supply devices.

The invention claimed is:

1. An oil supply device that supplies oil, comprising:
a pump configured to pump oil; and
a spool switch valve that has a spool in which a first land and a second land are coupled in an axial direction at a predetermined interval therebetween, and a housing accommodating the spool so that the spool can move in the axial direction, having an input port configured to receive the oil pumped from the pump, an output port configured to output the received oil, and a drain port configured to discharge the received oil, and having a first oil chamber defined therein by opposing surfaces of the first land and the second land, wherein the spool has the plurality of lands so that when located at a first position, the spool seals between the input port and the output port by the second land and allows the input port to communicate with the drain port, and when located at a second position, the spool allows the input port to communicate with the output port via the first oil chamber and seals between the input port and the drain port by the second land, the housing has a first seal surface on which the drain port is formed, and when located at the second position, the second land seals the first seal surface and the second land is placed on the first seal surface at an area that axially overlaps the drain port in order to completely cover the drain port and at an area between the drain port and the input port.

2. The oil supply device according to claim 1, wherein the input port includes a plurality of input ports that includes a first input port and a second input port configured to receive the oil pumped from the pump, when located at the first position, the spool seals between the first input port and the output port by the second land and allows the second input port to communicate with the drain port, and when located at the second position, the spool allows the first input port to communicate with the output port via the first oil chamber and seals between the second input port and the drain port by the second land, and the second input port axially overlaps the drain port.

3. The oil supply device according to claim 2, wherein the second input port and the drain port are formed so that an oil inflow direction and an oil outflow direction form an angle larger than 90 degrees and smaller than 270 degrees about an axis of the spool.

4. The oil supply device according to claim 1, wherein the pump is an electric pump that is configured to be supplied with electric power to pump the oil.

5. The oil supply device according to claim 4, further comprising:

a mechanical pump that is operated by power from a motor to generate an oil pressure, wherein the housing has a third input port that is configured to receive the oil pressure from the mechanical pump, when located at the first position, the spool further allows the third input port to communicate with the output port via the first oil chamber, and when located at the second position, the spool further seals between the third input port and the output port by the first land, the housing has a second seal surface on which the third input port is formed, and when located at the first position, the first land seals the second seal surface.

* * * * *